United States Patent
Liang

(10) Patent No.: US 12,169,879 B2
(45) Date of Patent: Dec. 17, 2024

(54) VIRTUAL PROP ALLOCATION METHOD AND RELATED APPARATUSES

(71) Applicant: TENCENT TECHNOLOGY (SHENZHEN) COMPANY LIMITED, Guangdong (CN)

(72) Inventor: Yuxuan Liang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/581,502

(22) Filed: Jan. 21, 2022

(65) Prior Publication Data

US 2022/0148231 A1    May 12, 2022

Related U.S. Application Data

(63) Continuation of application No. PCT/CN2020/124292, filed on Oct. 28, 2020.

(30) Foreign Application Priority Data

Jan. 6, 2020   (CN) .......................... 202010010741.3

(51) Int. Cl.
   *G06T 11/00*    (2006.01)
   *H04L 67/131*   (2022.01)
   *H04L 67/52*    (2022.01)

(52) U.S. Cl.
   CPC ............ *G06T 11/00* (2013.01); *H04L 67/131* (2022.05); *H04L 67/52* (2022.05)

(58) Field of Classification Search
   CPC ........ G06T 11/00; H04L 67/131; H04L 67/52
   See application file for complete search history.

(56) References Cited

U.S. PATENT DOCUMENTS

| 10,058,773 B2 * | 8/2018 | Huang ................... A63F 13/20 |
| 10,403,050 B1 * | 9/2019 | Beall ...................... G06T 7/292 |

(Continued)

FOREIGN PATENT DOCUMENTS

| CN | 108537582 A | 9/2018 |
| CN | 109274977 A | 1/2019 |

(Continued)

OTHER PUBLICATIONS

International Search Report dated Jan. 27, 2021 issued in corresponding application PCT/CN2020/124292 (with English translation).

(Continued)

*Primary Examiner* — Yu Chen
(74) *Attorney, Agent, or Firm* — ArentFox Schiff LLP

(57) ABSTRACT

Aspects of the disclosure provide methods and apparatuses of virtual prop allocation and provide non-transitory computer-readable storage mediums storing instructions for virtual prop allocation. A method of virtual prop allocation includes obtaining a geographic location and state information of at least one terminal device participating in a first scene, and determining a first virtual prop associated with the first scene based on the geographic location and the state information of the at least one terminal device participating in the first scene. Further, the method includes determining geographic location information for releasing the first virtual prop, and transmitting, to a first terminal device in the at least one terminal device, the geographic location information for releasing the first virtual prop.

10 Claims, 10 Drawing Sheets

(56) References Cited

U.S. PATENT DOCUMENTS

| | | | | |
|---|---|---|---|---|
| 10,796,489 | B1* | 10/2020 | Cordes | A63F 13/213 |
| 11,132,839 | B1* | 9/2021 | White | G06T 19/006 |
| 2007/0273558 | A1* | 11/2007 | Smith | G08G 1/0962 |
| | | | | 340/995.1 |
| 2012/0042253 | A1* | 2/2012 | Priyadarshan | G06Q 30/02 |
| | | | | 715/733 |
| 2014/0129342 | A1* | 5/2014 | Sanghavi | G06Q 30/0277 |
| | | | | 705/14.69 |
| 2015/0109338 | A1* | 4/2015 | McKinnon | G06T 19/006 |
| | | | | 345/633 |
| 2015/0205894 | A1* | 7/2015 | Faris | G06Q 30/0641 |
| | | | | 703/21 |
| 2018/0060204 | A1 | 3/2018 | Jin et al. | |
| 2018/0165888 | A1* | 6/2018 | Duan | G06Q 20/3224 |
| 2018/0367950 | A1* | 12/2018 | Guo | G01S 5/0072 |
| 2019/0213097 | A1 | 7/2019 | Jin et al. | |
| 2019/0221031 | A1* | 7/2019 | de la Carcova | A63J 5/02 |
| 2019/0221036 | A1* | 7/2019 | Griffin | A63G 31/16 |
| 2019/0342620 | A1* | 11/2019 | Yan | H04N 21/25841 |
| 2020/0054939 | A1* | 2/2020 | Golden | A63F 13/35 |
| 2020/0218626 | A1 | 7/2020 | Jin et al. | |
| 2020/0250430 | A1* | 8/2020 | Kishore | G01S 19/48 |
| 2020/0297262 | A1* | 9/2020 | Chappell, III | H04N 21/42201 |
| 2020/0394051 | A1* | 12/2020 | Chen | G06F 11/3428 |
| 2022/0028032 | A1* | 1/2022 | Feimster | H04N 21/431 |

FOREIGN PATENT DOCUMENTS

| | | |
|---|---|---|
| CN | 109284714 A | 1/2019 |
| CN | 109829703 A | 5/2019 |
| CN | 111221416 A | 6/2020 |
| JP | 2005530365 A | 10/2005 |
| KR | 10-2019-0097148 A | 8/2019 |

OTHER PUBLICATIONS

Supplementary European Search Report issued Sep. 5, 2022 in Application No. 20911764.7. (9 pages).

Japanese Office Action issued May 29, 2023 in Application No. 2022-517927. (23 pages).

What are the PokéStops that can get KiDD and [Pokémon go Cheats] items?, Dec. 24, 2018, AppBank Corporation, pp. 1-8.

Pocket Study Group, 100% Mook Series Game Cheats vol. 13 Pocket Monster let'S go! Pikachu let'S go!, EEV, vol. 13, Japan, K.K. Shinyusha, Jan. 1, 2019, pp. 119.

Office Action received for Korean Patent Application No. 10-2022-7005601, mailed on Apr. 30, 2024, 11 pages (6 pages of English Translation and 5 pages of Original Document).

* cited by examiner

VIRTUAL PROP ALLOCATION METHOD AND RELATED APPARATUSES

RELATED APPLICATIONS

This application is a continuation of International Application No. PCT/CN2020/124292, entitled "VIRTUAL PROP ALLOCATION METHOD AND RELATED APPARATUSES" and filed on Oct. 28, 2020, which claims priority to Chinese Patent Application No. 202010010741.3, entitled "VIRTUAL PROP ALLOCATION METHOD, SERVER, AND TERMINAL DEVICE" filed with the China National Intellectual Property Administration on Jan. 6, 2020. The entire disclosures of the prior applications are hereby incorporated by reference in their entirety.

FIELD OF THE TECHNOLOGY

Embodiments of this disclosure relate to the field of augmented reality (AR) technologies, including virtual prop allocation.

BACKGROUND OF THE DISCLOSURE

Conventional offline marketing and promotion are often affected by costs such as place of origin, flow of people, and expenses, and consequently offline promotional and interactive activities are conducted only simply. However, with the development of the Internet and information technologies, the Internet technology also plays an important role in dissemination and promotion. Therefore, after the integration of the Internet technology into the promotional and interactive activities, a series of online interactive activities such as receiving a prize on a turntable and drawing a lottery on a turntable gradually appear.

SUMMARY

Embodiments of this disclosure provide a virtual prop allocation method and related apparatuses, which are used to greatly enrich a user's experience and interestingness in interactive activities, and present a complete effect experience in combination with interactive props.

Some aspects of the disclosure provide a method of virtual prop allocation by a server device. The method can be performed by circuitry, such as processing circuitry, interface circuitry and the like of the server device. The method includes obtaining a geographic location and state information of at least one terminal device participating in a first scene, and determining a first virtual prop associated with the first scene based on the geographic location and the state information of the at least one terminal device participating in the first scene. Further, the method includes determining geographic location information for releasing the first virtual prop, and transmitting, to a first terminal device in the at least one terminal device, the geographic location information for releasing the first virtual prop.

Some aspects of the disclosure provide a method of virtual prop allocation by a terminal device. The method can be performed by circuitry, such as processing circuitry, interface circuitry of the terminal device. The method includes obtaining a geographic location and state information of the terminal device in a first scene, transmitting the geographic location and the state information to a server device. The server device determines a first virtual prop in the first scene for the terminal device based on the geographic location and the state information of the terminal device. The method includes receiving geographic location information for releasing the first virtual prop transmitted by the server device, and obtaining the first virtual prop according to the geographic location information for releasing the first virtual prop.

According to another aspect, an embodiment of this disclosure provides a non-transitory computer-readable storage medium, configured to store a computer program, the computer program being configured to perform the methods according to the foregoing aspects.

According to another aspect, an embodiment of this disclosure provides a computer program product including instructions. When run on a computer, the instructions cause the computer to perform the methods according to the foregoing aspects.

According to the foregoing technical solutions, the embodiments of this disclosure can have the following advantages.

In an embodiment of this disclosure, after obtaining a geographic location and state information of at least one terminal device in a first scene, based on the geographic location and the state information of each terminal device, a first virtual prop corresponding to each terminal device is determined, and geographic location information of releasing the corresponding first virtual prop is transmitted to each terminal device, so that each terminal device can obtain the corresponding first virtual prop from the corresponding geographic location according to the obtained geographic location information. Through a combination of the geographic location and the state information, virtual props that can be allocated to each terminal device in different scenes are determined, which greatly enriches a user's experience and interestingness in interactive activities, and presents a complete effect experience in combination with interactive props.

BRIEF DESCRIPTION OF THE DRAWINGS

To describe the technical solutions in the embodiments of this disclosure or in the related art more clearly, the following briefly describes the accompanying drawings required for describing the embodiments. The accompanying drawings in the following description show some embodiments of this disclosure.

DESCRIPTION OF EMBODIMENTS

Embodiments of this disclosure provide a virtual prop allocation method, a server, and a terminal device, which are used to greatly enrich a user's experience and interest in interactive activities, and present a more complete effect experience in combination with interactive props.

The following describes the technical solutions in the embodiments of this disclosure with reference to the accompanying drawings in the embodiments of this disclosure. The described embodiments are some exemplary embodiments of this disclosure.

In the specification, claims, and accompanying drawings of this disclosure, the terms "first", "second", "third", "fourth", and the like (if existing) are intended to distinguish between similar objects rather than describe a specific sequence or a precedence order. The data termed in such a way are interchangeable in proper circumstances, so that the embodiments of this disclosure described herein can be implemented in orders other than the order illustrated or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device. Naming or numbering of steps appearing in this disclosure does not mean that steps in a method flow need to be performed in a time/logical order indicated by the naming or the numbering. Process steps that have been named or numbered can be changed in order of execution according to the technical purpose to be achieved, as long as the same or similar technical effects can be achieved.

Some related online promotional and interactive activities appear in a series of forms, such as prize receiving and lottery drawing, and each time of lottery drawing is only for one user, making it impossible to bring more users a strong interestingness and interactivity; in addition, virtual prize receiving is simply implemented based on a positioning map or a user is informed of the drawn lottery after the lottery drawing in a conventional method, but due to a factor that the user often walks around and other factors, the prize receiving may be affected, making it impossible to perceive the user's relevant situation. As a result, the user interaction experience brought by the related interactive methods is not good, and it is difficult to present a complete effect experience in combination with interactive props.

Figure 1:
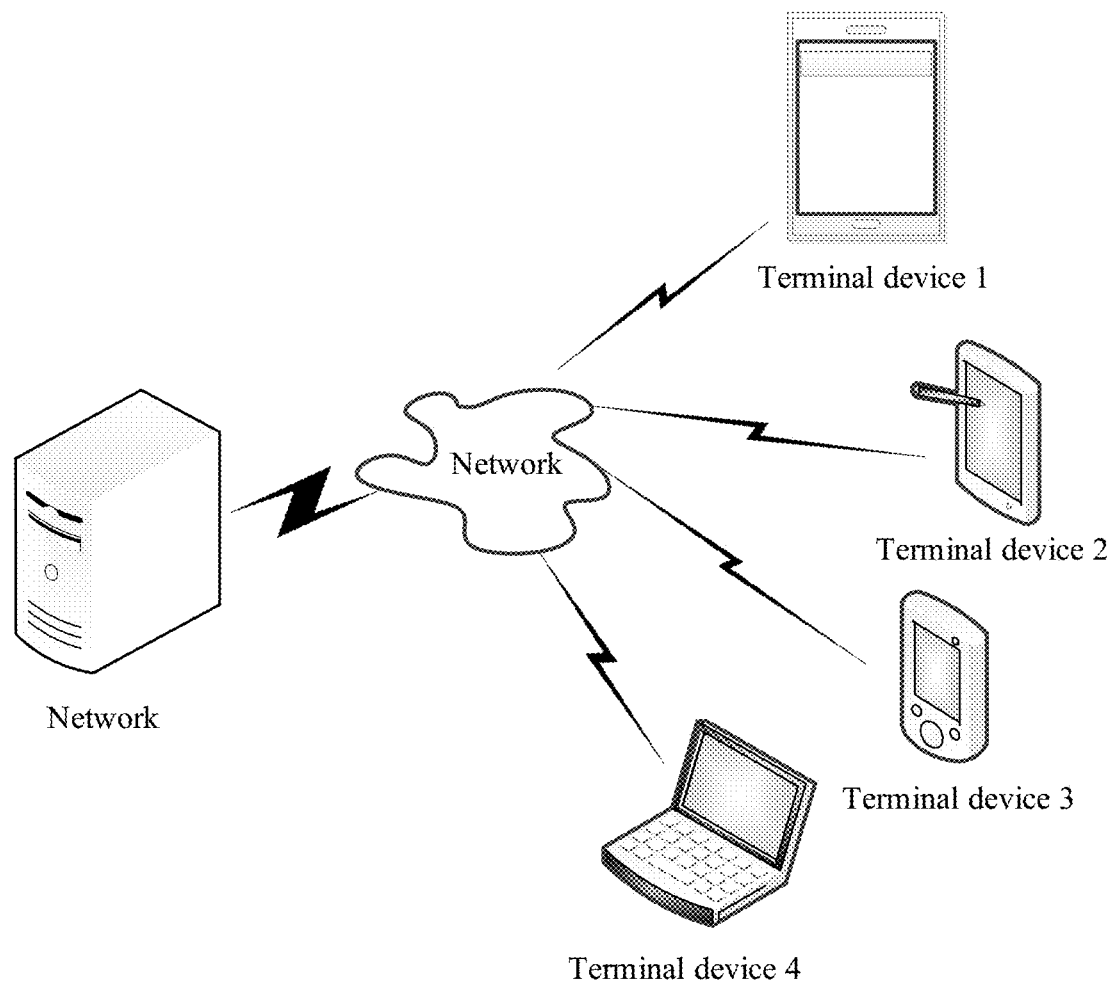
FIG. 1 is a schematic architectural diagram of a virtual prop allocation system according to an embodiment of this disclosure.

Therefore, to solve the above-mentioned problem, an embodiment of this disclosure provides a virtual prop allocation method, which can be applicable to the schematic architectural diagram of a system shown in FIG. 1. FIG. 1 is a schematic architectural diagram of a virtual prop allocation system according to an embodiment of this disclosure. As can be seen from FIG. 1, the system includes at least one terminal device and a server (also referred to as server device). In the same interactive activity, a plurality of users can be added together, and each user can hold one terminal device, such as: a terminal device 1, a terminal device 2, a terminal device 3, a terminal device 4, and the like. Each terminal device obtains its own geographic location and state information, where the state information can include but is not limited to a current environment in which a user is located, and user characteristic information related to the user. In this way, the terminal device can transmit the geographic location and the state information to the server, so that the server can obtain the geographic location and the state information of the user in real time, and then determine a virtual prop allocated to each terminal device. For different scenes, there are corresponding virtual props, that is, different lottery rewards. In this way, the server determines the geographic location where each virtual prop is released according to a configured rule, and transmit the geographic location to the corresponding terminal device through voice broadcast, text display or other presentation methods, so that the corresponding terminal device guides the corresponding user to obtain the virtual prop according to the geographic location where the virtual prop is released.

The server can be considered as being integrated with at least an AR processing capability, a location based service (LBS) capability, and a voice processing capability.

The terminal device described above is integrated with at least a camera, a camera sensor and other devices. In practical disclosures, the terminal device includes but is not limited to a mobile phone, a mobile terminal, a tablet computer, a laptop, etc., or a wearable smart device with a communication function, such as a smart watch or a smart bracelet, and is not specifically limited in the embodiments of this disclosure.

Figure 2:
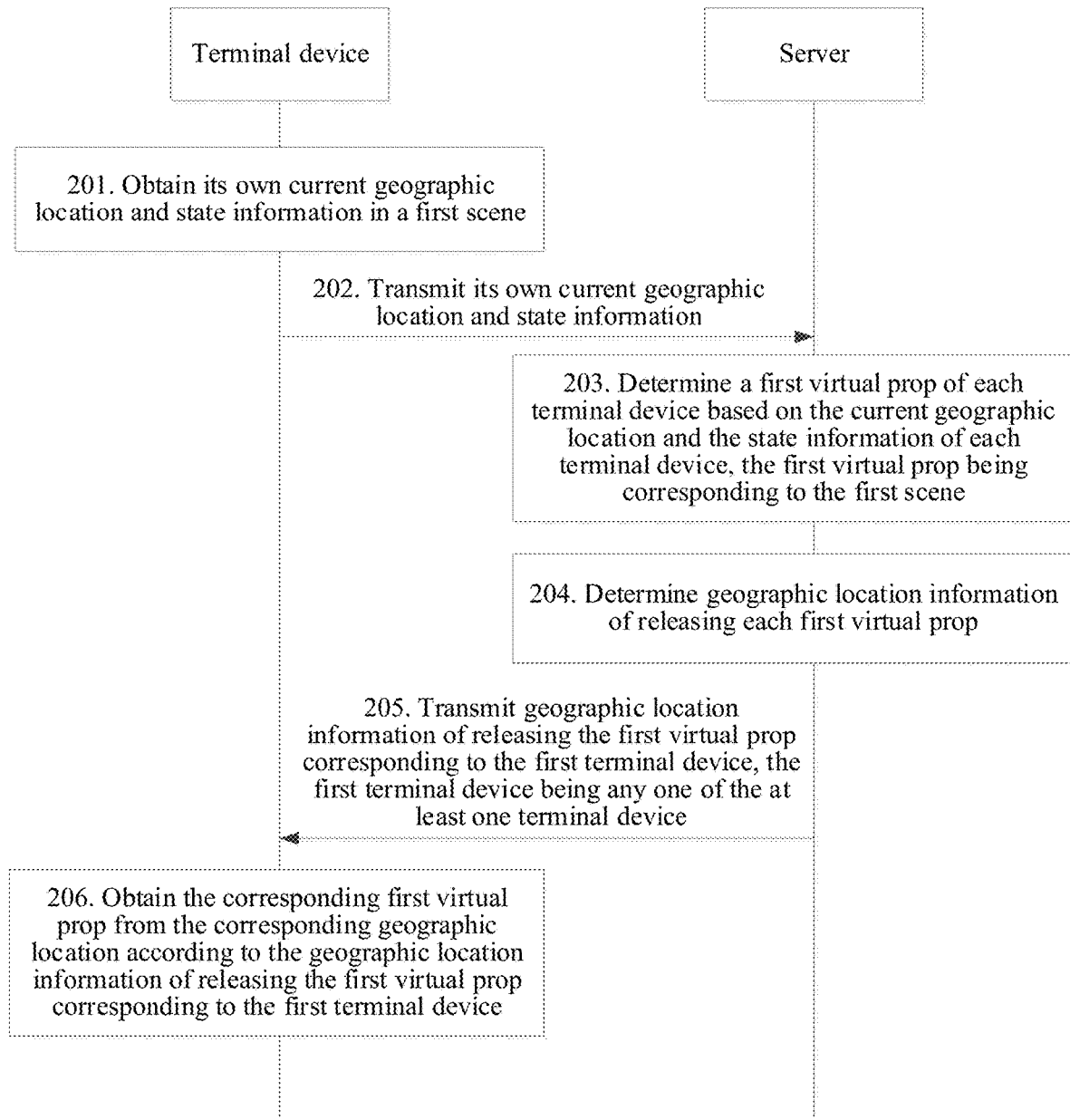
FIG. 2 is a schematic diagram of an embodiment of a virtual prop allocation method according to an embodiment of this disclosure.

To facilitate a better understanding of the solutions provided in the embodiments of this disclosure, a specific process in the embodiments of this disclosure is introduced below. Referring to FIG. 2, an embodiment of this disclosure provides an embodiment of a virtual prop allocation method, including:

At step 201, at least one terminal device obtains its own current geographic location and state information in a first scene.

For ease of description, in the following embodiments, description of the current geographic location is mainly used to indicate the geographic location of the terminal device when the terminal device obtains the geographic location and the state information.

In this embodiment, after at least one user joins the same interactive activity, rewards that the user can obtain in the interactive activity are always affected by the user's location, environment factors, etc. Therefore, the terminal device held by each user obtains the geographic location and the state information.

The above-described scene may be similar to a level in a certain treasure hunt interactive activity, a first scene may be any level in the treasure hunt interactive activity, and the first scene is not specifically limited in the embodiments of this disclosure.

The current geographic location described includes but is not limited to any one of the following: physical MAC address of Wi-Fi (wifiMac), cellID (operator base station), IP address, longitude and latitude obtained through positioning (such as GPS positioning), etc. The described state information includes but is not limited to any one of the following: current environment information and user characteristic information, where the current environment information may include but is not limited to current temperature condition, weather condition, or date, etc., and the user characteristic information may include but is not limited to, a user's age, consumption situation, and the like. It should be understood that the above-mentioned current geographic location, state information, current environment information, and user characteristic information may be other information in practical applications in addition to the situations described above, and are not specifically limited in the embodiments of this disclosure.

In some examples, in some other embodiments, accuracy of the current geographic location can be corrected based on information about the current ambient environment where the user is located and other information, so that the current geographic location provided to a server is most accurate, and matches an actual location of the user to the greatest extent. The correction can be performed mainly in the following two manners.

Manner 1: Each terminal device collects its own first ambient environment information through a configured camera, and then each terminal device corrects the current geographic location based on its own corresponding Internet Protocol (IP) address and the first ambient environment information.

That is, the first ambient environment information may be about an ambient environment of a current location of the terminal device, such as an ambient building, residential quarter, or highway, and is not specifically described in the embodiments of this disclosure. The terminal device can obtain its own IP information from a base station covering a certain region, so that the terminal device can determine a wider location range based on the IP information, and can correct the current geographic location after combining the location range with the first ambient environment information. Therefore, the corrected current geographic location matches a user's actual location to the greatest extent, and the user's activity experience is greatly improved.

Manner 2: Each terminal device obtains a plurality of pieces of historical geographic location information, and collects its own second ambient environment information through a configured camera; then, each terminal device corrects the current geographic location based on the plurality of pieces of historical geographic location information and the second ambient environment information.

In this embodiment, the historical geographic location information can be obtained from a location search server, such as Google search or search map. After obtaining a plurality of pieces of historical geographic location information, each terminal device trains and classifies the plurality of pieces of historical geographic location information based on a Knn (K nearest neighbors) classification method, so that styles of the historical geographic location information included in each category are similar, and then a style that matches the second ambient environment information is selected, such as a style with temperature, to correct the current geographic location.

In addition to correcting the current geographic location by using the above-mentioned manner 1 and manner 2, other manners may be further included in practical applications, which are not limited in the embodiments of this disclosure.

At step 202, each terminal device transmits its own current geographic location and state information to a server.

At step 203, the server determines a first virtual prop of each terminal device based on the current geographic location and the state information of each terminal device, the first virtual prop being corresponding to the first scene.

Figure 3:
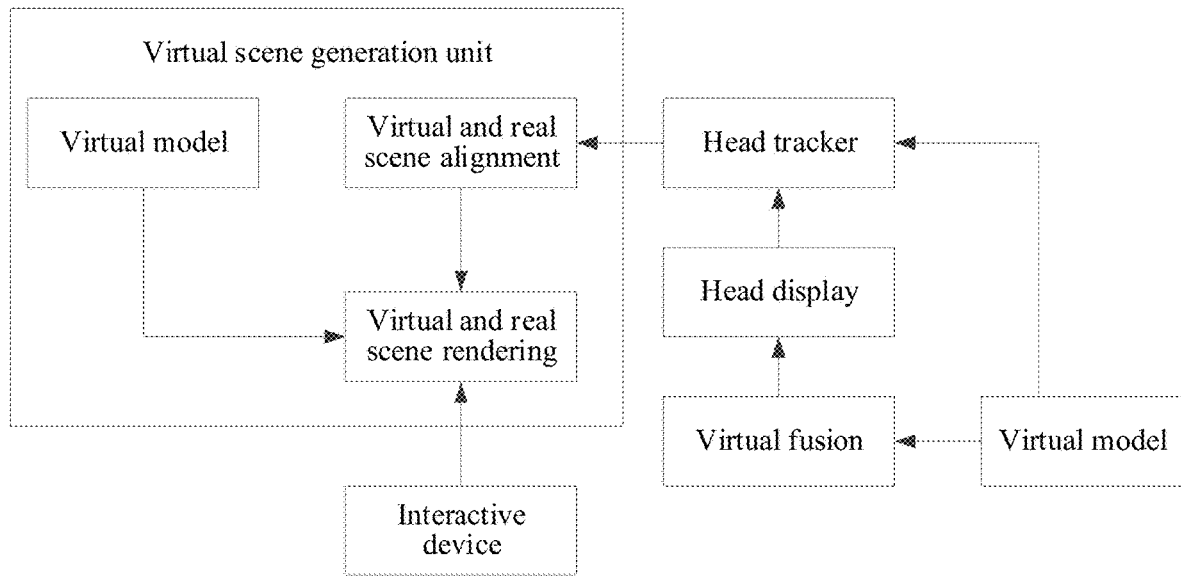
FIG. 3 is a schematic structural diagram of an AR system according to an embodiment of this disclosure.

In this embodiment, based on an AR technology, the server can superimpose a virtual prop on a real video image, thereby synthesizing a video image with the virtual prop, and combining the virtual prop and the real video image. In this way, the user looks for the virtual prop through the video image displayed by the terminal device held by the user. FIG. 3 is a schematic structural diagram of an AR system according to an embodiment of this disclosure. It can be seen from FIG. 3 that the AR system includes a virtual scene generation unit and an interactive device such as a head display and a helmet. The virtual scene generation unit is responsible for modeling, management, rendering of virtual scenes and management of other peripherals; the head display is responsible for displaying a signal after a fusion of virtuality and reality; a head tracker tracks changes in sight of a user; and the interactive device is used to input and output sensory signals and environment control operation signals. First, after collecting videos or images of a real scene, a camera and a sensor transmit the videos or the images of the real scene to the server for analysis and reconstruction, and the server analyzes a relative location between a virtual scene and the real scene in combination with data of the head tracker, to align coordinate systems and perform a fusion calculation on the virtual scene; and the interactive device collects external control signals to implement interactive operations on a combination of virtual and real scenes. The fused information is displayed on the head display in real time and presented in the field of vision of the user.

In addition, each scene is equipped with a different virtual prop. For example, a first scene corresponds to a first virtual prop, and a second scene corresponds to a second virtual prop. A higher level of a scene indicates a higher level of a virtual prop. For example, similar to levels in a treasure hunt interactive activity, each level corresponds to a different reward, and a higher level indicates a higher corresponding difficulty, so rewards are richer.

The current geographic location and the state information of the terminal device further affect the probability that a user can obtain richer virtual props. Therefore, after obtaining the current geographic location and the state information of each terminal device in the first scene, the server determines the first virtual prop that needs to be allocated to each terminal device based on the current geographic location and the state information of each terminal device.

For ease of description, in the following embodiments, description of the current environment is mainly used to indicate the environment where the terminal device is located when the terminal device obtains the geographic location and the state information. In some examples, in some other embodiments, because the state information can include the current environment information and the user characteristic information, the server can determine the first virtual prop of each terminal device based on the current environment information and the user characteristic information.

In some examples, the at least one terminal device is specifically a plurality of terminal devices, then at step 203, the server can perform follows:

the server groups the plurality of terminal devices based on the current geographic location of each terminal device to obtain at least one terminal device group;

the server determines a region corresponding to each terminal device group on a map, where the map is pre-divided into a plurality of regions with corresponding geographic location ranges;

the server determines an allocation weight of a corresponding terminal device according to each piece of user characteristic information; and the server determines the first virtual prop of each terminal device based on each piece of current environment information and the allocation weight of each terminal device in a case that there is a corresponding virtual prop in the region corresponding to each terminal device group.

It can be understood that when a large quantity of users participate in the same interactive activity, it is impossible for each user to perceive situations of the rest of the users, so it is necessary to group users by region. That is, specifically, the server groups at least one terminal device based on the current geographic location of each terminal device, to obtain at least one terminal device group.

Figure 4:
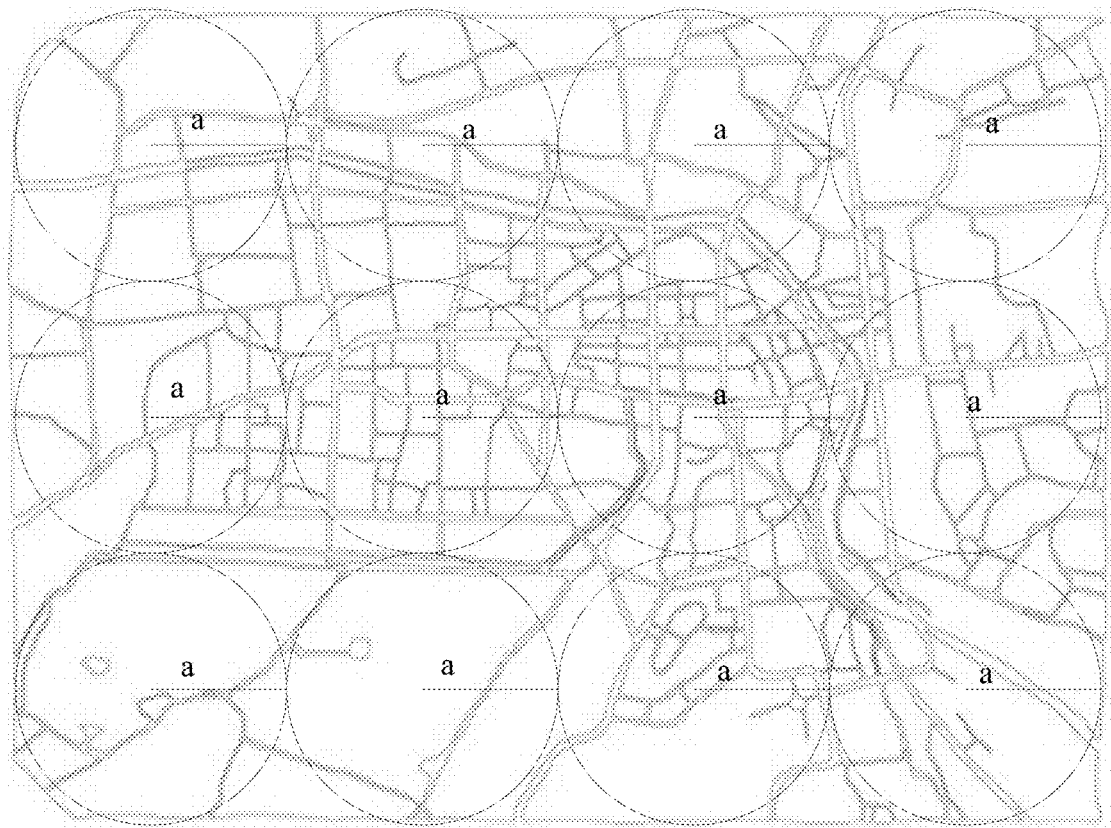
FIG. 4 is a schematic diagram of dividing a map into regions according to an embodiment of this disclosure.

Because the server has divided an activity range of the interactive activity based on a certain preset rule in advance, and then based on the AR technology, the divided activity range is presented in a virtual form of a map. The map can be a graphic result of zooming out and drawing a surveyed street graphic according to a certain ratio. In an embodiment of this disclosure, a size of a region can be set, and the map can be divided into a plurality of regions according to the set size of the region, so that the map in which a size of each region corresponds to the set size of the region can be divided into a plurality of regions, and each region can include a corresponding geographic location range. FIG. 4 is a schematic diagram of dividing a map into regions according to an embodiment of this disclosure. It can be seen from FIG. 4 that taking a circular region with the radius a as an example, after setting the radius of the circular region, the map can be divided into a plurality of circular regions, and the radius of each circular region corresponds to the set radius of the circular region. In addition, in the embodiments of this disclosure, the quantity of regions is not limited, and the radius of the circular region described above is not limited either. In addition, in addition to the above-mentioned division into the circular regions, in practical applications, the map may alternatively be divided into regions of other shapes, for example, a square with a side length of x, which are not specifically limited in the embodiments of this disclosure.

Figure 5:
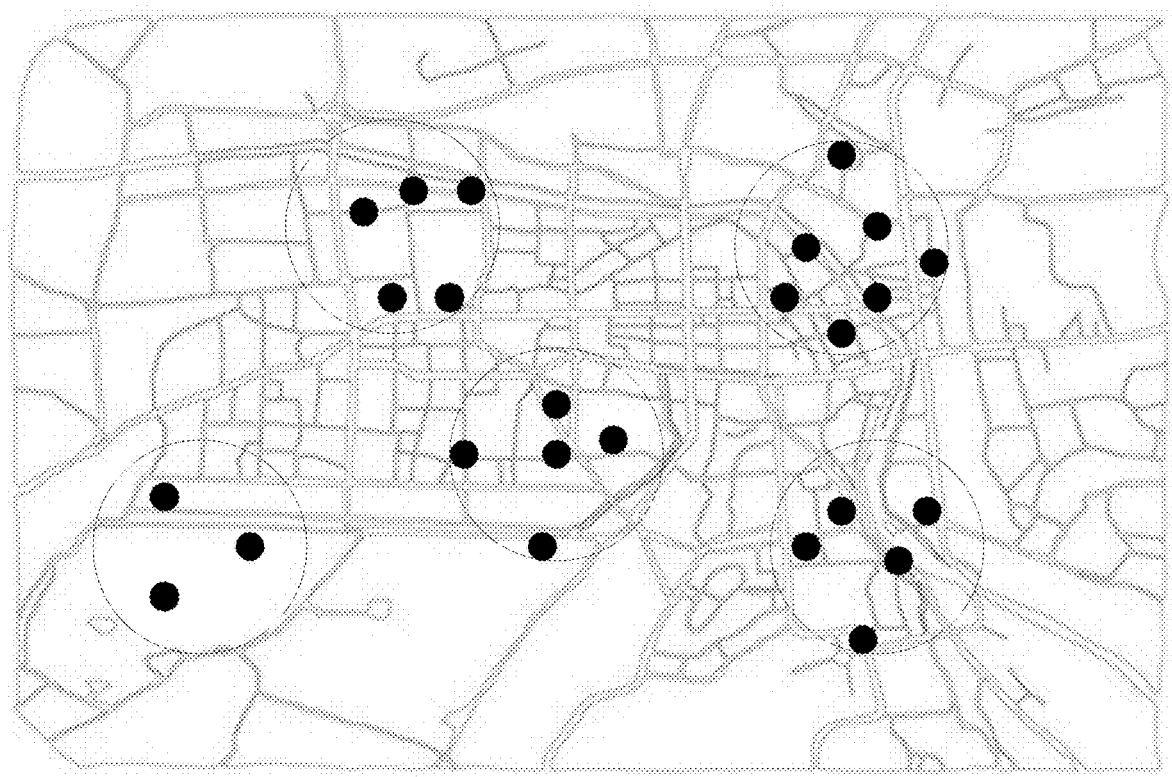
FIG. 5 is a schematic diagram of showing a region corresponding to a virtual prop on a map according to an embodiment of this disclosure.

An organizer of an interactive activity may randomly or specifically release virtual props in advance in any location in an activity region based on different needs. For example, virtual props can be released according to distribution density of the crowd. Generally, higher distribution density of the crowd in a region indicates more virtual props released at locations corresponding to the region. In practical applications, other methods can be further used to release the virtual props, which are not specifically limited herein. FIG. 5 is a schematic diagram of showing a region corresponding to a virtual prop on a map according to an embodiment of this disclosure. It can be seen from FIG. 5 that for each circular region, at least one virtual prop can be released in the circular region, where a black dot represents a virtual prop.

Therefore, after the terminal devices are grouped, the server can determine a region corresponding to each terminal device group on the map. That is, it can be understood as determining a region on the map in which each terminal device in each terminal device group is specifically located.

Figure 6:
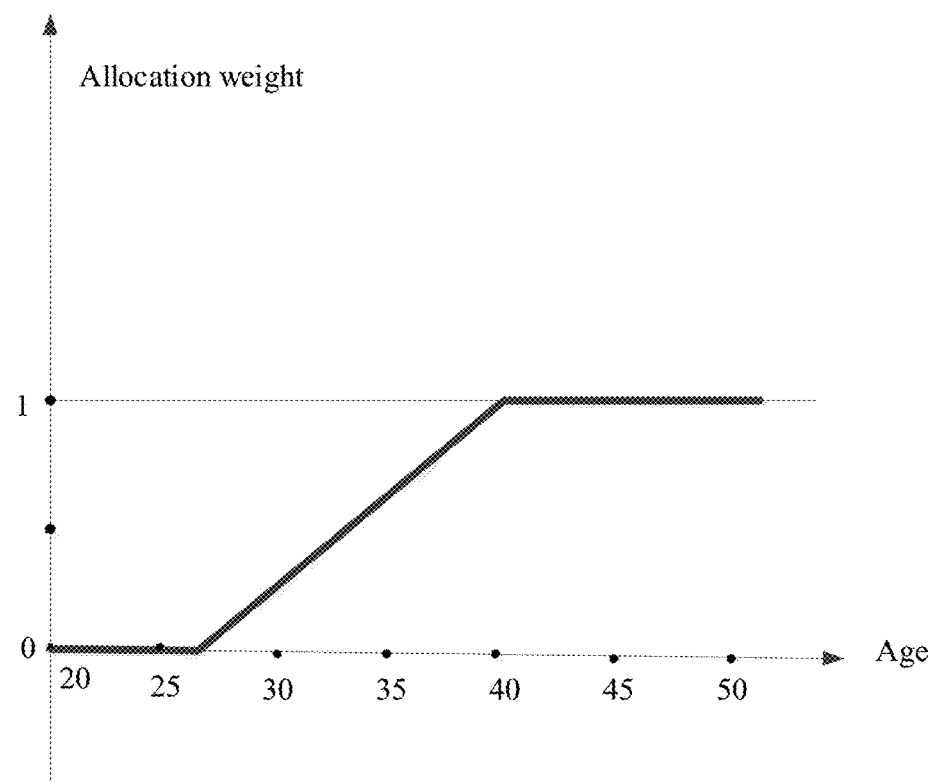
FIG. 6 is a schematic diagram of determining an allocation weight by age according to an embodiment of this disclosure.

However, different user characteristic information may further affect the probability that a user can obtain the corresponding virtual prop, such as a user's consumption situation or age. Generally, richer virtual props can always be allocated to users who spend more money; and if an interactive activity is to promote a certain emerging electronic product, richer virtual props can also be allocated to users at youthful ages. For example, FIG. 6 is a schematic diagram of determining an allocation weight by age according to an embodiment of this disclosure. It can be seen from FIG. 6 that as the age grows, the allocation weight determined is higher. Specifically, the allocation weight can be determined from the following prediction model:

$$ln\left(\frac{p}{1-p}\right) = -26.52 + 0.78age,$$

where age denotes a user age, $\beta_0 = -26.52$ represents the allocation weight when the user age is 0, $\beta_1 = 0.78$ represents that when the user age increases by one unit, the corresponding allocation weight increases by 0.78. Therefore, a final allocation weight formula is:

$$p = \frac{\exp(-26.52 + 0.78age)}{\exp(-26.52 + 0.78age) + 1} = \frac{e^{-26.52+0.78age}}{e^{-26.52+0.78age} + 1}.$$

The above-mentioned $\beta_0 = -26.52$ and $\beta_1 0.78$ are determined based on actual ages of a plurality of users, are only used for description herein, and should depend on situations in practical applications.

Therefore, the server can determine the allocation weight of the corresponding terminal device based on each piece of user characteristic information, that is, determine the probability that each terminal device obtains the corresponding virtual prop, so that the possibility of obtaining virtual props in different interactive activities can be increased according to an actual situation of a user, enhancing the user's interestingness and experience in the interactive activity. In addition, in addition to the above-mentioned consumption situation or age, the user characteristic information described above may further include other characteristic information in practical applications, which is not limited herein.

Therefore, the server determines the first virtual prop of each terminal device based on each piece of current environment information and the allocation weight of each terminal device in a case that there is a corresponding virtual prop in the region corresponding to each terminal device group.

That is, it is understood that if there is a corresponding virtual prop in the region corresponding to each terminal device group, because different virtual props are allocated in different current environments, the server still needs to select candidate virtual props from a prop pool based on the current environment information. On this basis, the server determines the first virtual prop of each terminal device from the candidate virtual props based on the previously determined allocation weight of each terminal device.

For example, if the current environment information includes rainy day, an allocation weight of a terminal device 1 is 0.3, an allocation weight of a terminal device 2 is 0.5, and an allocation weight of a terminal device 3 is 0.2, the server finds all candidate virtual props related to the rainy day from the prop pool in the region corresponding to the terminal device group, for example, a small umbrella, a large umbrella, or a car. In this case, obviously, the server determines the car as the first virtual prop of the terminal device 2, the large umbrella as the first virtual prop of the terminal device 1, and the small umbrella as the first virtual prop of the terminal device 1. Therefore, in this embodiment, a combination of the user characteristic information, the current environment information and other state information enriches the user experience in interactive activities, and can fully present the effect experience of interactive props.

The above-mentioned current environment information may include but is not limited to temperature, weather, or date, where the temperature includes but is not limited to high temperature, low temperature, etc., the weather includes but is not limited to sunny days, rainy days, etc., and the date can be a holiday, non-holiday, etc., which are not specifically limited in the embodiments of this disclosure.

In some examples, in some other embodiments, for the above-mentioned grouping method, a relative location between any two terminal devices can be determined based on the current geographic location of each terminal device; and the server groups at least one terminal device based on the relative location between the any two terminal devices.

Figure 7:
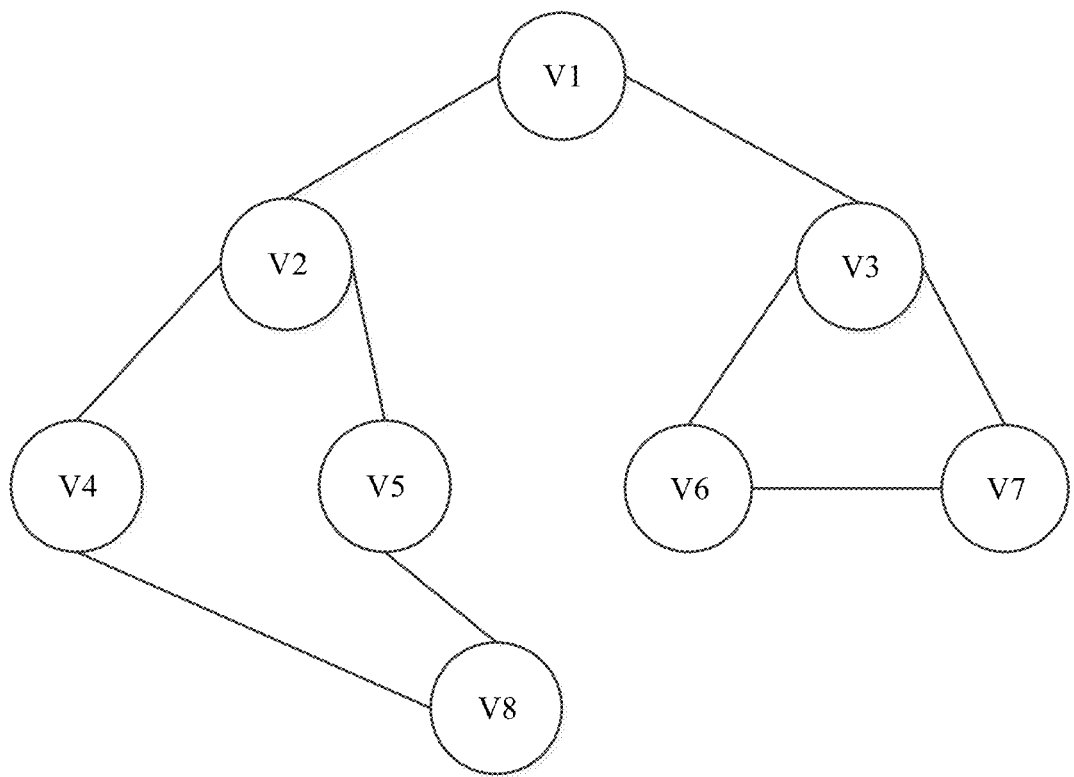
FIG. 7 is a schematic diagram of performing grouping through a breadth-first algorithm according to an embodiment of this disclosure.

In some examples, in some other embodiments, the current geographic locations of any two terminal devices can be calculated by the server through a breadth-first algorithm to obtain the relative location between the any two terminal devices. Specifically, FIG. 7 is a schematic diagram of performing grouping through a breadth-first algorithm according to an embodiment of this disclosure. Taking V1 to V8 respectively representing terminal device 1 to terminal device 8 as an example, it can be seen from FIG. 7 that V1 is added to a region, V1 is taken out, and marked as true (that is, has been visited), and an adjacent point thereof is added to the region, then ←[V2 V3]; V2 is taken out, and marked as true (that is, has been visited), and an unvisited adjacent point thereof is added to the region, then ←[V3 V4 V5]; V3 is taken out, and marked as true (that is, has been visited), and an unvisited adjacent point thereof is added to the region, then ←[V4 V5 V6 V7]; V4 is taken out, and marked as true (that is, has been visited), and an unvisited adjacent point thereof is added to the region, then ←[V5 V6 V7 V8]; V5 is taken out, and marked as true (that is, has been visited), and because an adjacent point thereof has been added to the region, then ←[V6 V7 V8]; V6 is taken out, and marked as true (that is, has been visited), and an unvisited adjacent point thereof is added to the region, then ←[V7 V8]; V7 is taken out, and marked as true (that is, has been visited), and an unvisited adjacent point thereof is added to the region, then ←[V8]; and V8 is taken out, and marked as true (that is, has been visited), and an unvisited adjacent point thereof is added to the region, then ←[ ]. In this way, a relative location between any two terminal devices can be determined through layer-by-layer downward traversal, to determine a group based on the relative location.

If the above-mentioned relative location is within a preset range, the any two terminal devices can be classified into the same group.

At step 204, the server determines geographic location information of releasing each first virtual prop.

In this embodiment, an organizer of an interactive activity may randomly or specifically release virtual props in advance in any location in an activity region based on different needs. For example, virtual props can be released according to distribution density of the crowd. Generally, higher distribution density of the crowd in a region indicates more virtual props released at locations corresponding to the region. In practical applications, other methods can be further used to release the virtual props, which are not specifically limited herein. In this case, the server may generate a correspondence based on the virtual props released randomly or specifically and the corresponding geographic location information of releasing each virtual prop, and store the correspondence in a database.

In this way, after determining the first virtual prop that can be allocated to each terminal device, the server can determine the geographic location information of releasing each first virtual prop based on the corresponding correspondence.

At step 205, the server transmits, to a first terminal device, geographic location information of releasing a first virtual prop corresponding to the first terminal device, the first terminal device being any one of the at least one terminal device.

In this embodiment, because the geographic location information of releasing each first virtual prop can be used to indicate that a corresponding terminal device obtains the corresponding first virtual prop from the corresponding geographic location. That is, the geographic location information of releasing each first virtual prop indicates the geographic location where the first virtual prop is released, for example, a corner on the first floor of a certain shopping mall. Therefore, after obtaining the geographic location information of releasing each first virtual prop, the server can transmit the geographic location information to the corresponding terminal device, and specifically, can transmit the geographic location information to any one of the at least one terminal device, so that the first terminal device can obtain the corresponding first virtual prop from the corresponding geographic location under an indication of the geographic location information of releasing the first virtual prop corresponding to the first terminal device.

For example, in some other embodiments, for step 205, the server may inform the corresponding first terminal device of the geographic location information of releasing the first virtual prop corresponding to the first terminal device through a voice message or a text message.

Figure 8:
FIG. 8 is a schematic diagram of feeding back released geographic location information by voice according to an embodiment of this disclosure.
Figure 9:
FIG. 9 is a schematic diagram of feeding back released geographic location information by text according to an embodiment of this disclosure.

That is, after determining the geographic location information of releasing each first virtual prop, the server carries the geographic location information of releasing each first virtual prop in the voice message or the text message, and transmits the voice message or the text message to the corresponding first terminal device, so that the interactivity of interaction is improved by using voice or text. FIG. 8 is a schematic diagram of feeding back released geographic location information by voice according to an embodiment of this disclosure. Similarly, FIG. 9 is a schematic diagram of feeding back released geographic location information by text according to an embodiment of this disclosure. It should be understood that in practical applications, the first terminal device can be further informed of the geographic location information of releasing the corresponding first virtual prop through another notification messages in addition to the voice message or the text message, which is not specifically limited in this disclosure.

At step 206, the first terminal device obtains the corresponding first virtual prop from the corresponding geographic location according to the geographic location information of releasing the first virtual prop corresponding to the first terminal device.

In this embodiment, once receiving the geographic location information of releasing the first virtual prop corresponding to the first terminal device that is transmitted from the server, the first terminal device can then obtain the first virtual prop from the corresponding geographic location under the indication of the geographic location information of releasing the first virtual prop.

Figure 10:
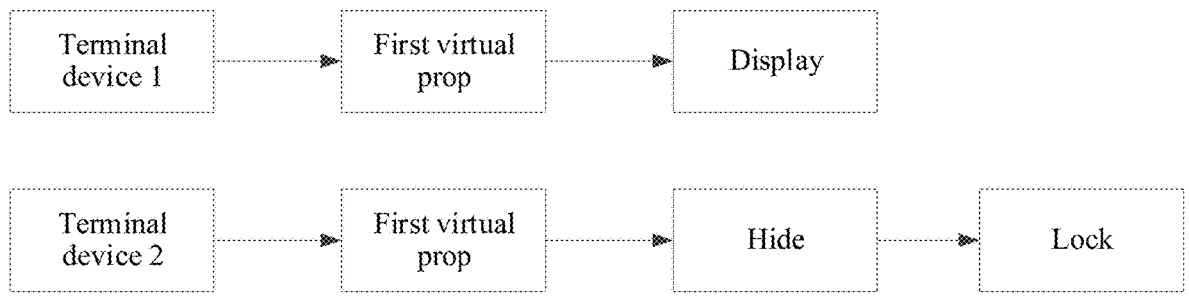
FIG. 10 is a schematic diagram of displaying or hiding a first virtual prop according to an embodiment of this disclosure.

Further, after the geographic location where the first virtual prop is released is reached according to the geographic location information of releasing the first virtual prop, reference is made to FIG. 10, which is a schematic diagram of displaying or hiding the first virtual prop according to an embodiment of this disclosure. It can be seen from FIG. 10 that if the first virtual prop corresponding to the terminal device 1 appears in a displayed manner, then the terminal device 1 can directly obtain the first virtual prop. However, if the first virtual prop corresponding to the terminal device 2 appears in a hidden manner, such as: locked or encrypted, then the terminal device 2 needs to perform an unlocking operation on the first virtual prop that is in a locked or encrypted state. For example, a task such as singing specified by the unlocking operation is performed, so that the first terminal device can obtain the first virtual prop after being unlocked successfully, which fully enhances a user's experience and interestingness in the entire interactive activity.

For example, in some other embodiments, the first terminal device can receive the geographic location information of releasing the first virtual prop corresponding to the first terminal device by receiving the voice message or the text message transmitted by the server, so that the first terminal device can play the voice message, or display the text message on a display interface, and a user corresponding to the first terminal device can obtain the first virtual prop from the corresponding geographic location according to the indication of the geographic location information of releasing the first virtual prop played by the voice message; or, obtain the first virtual prop from the corresponding geographic location under the indication of the text message, so that the interactivity of interaction is improved by using voice or text. It should be understood that in practical applications, the geographic location information of releasing the first virtual prop corresponding to the first terminal device may be further obtained through another notification message in addition to the voice message or the text message, which is not specifically limited in this disclosure.

Figure 11:
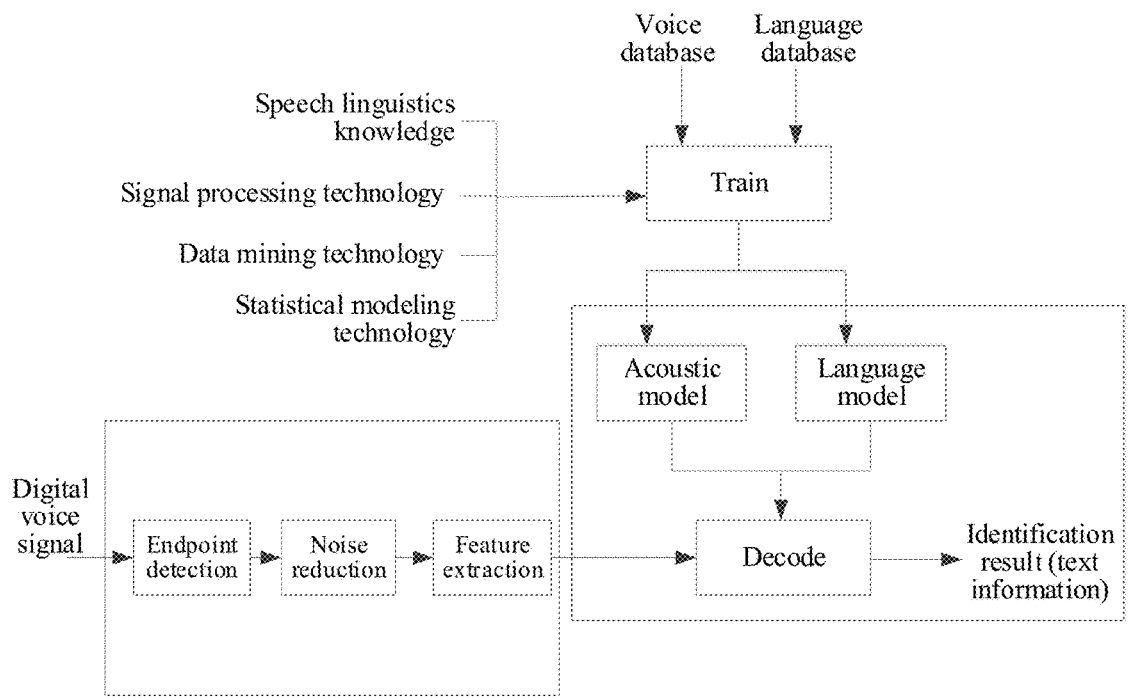
FIG. 11 is a voice interaction system according to an embodiment of this disclosure.

In addition, each terminal device can obtain its own user's voice message or text message, and then transmit the user's voice message or text message to the server, so that the server feeds back the corresponding content. FIG. 11 is a voice interaction system according to an embodiment of this disclosure. It can be seen from FIG. 11 that the terminal device collects a digital voice signal, and then transmits the digital voice signal to the server after endpoint detection, noise reduction, and feature extraction. In this case, the server trains a speech database or a language database through speech linguistics knowledge, a signal processing technology, a data mining technology, and a statistical modeling method to obtain an acoustic model or a language model, and then decodes the digital voice signal after feature extraction based on the acoustic module or language model to obtain an identification result, that is, text information.

Figure 12:
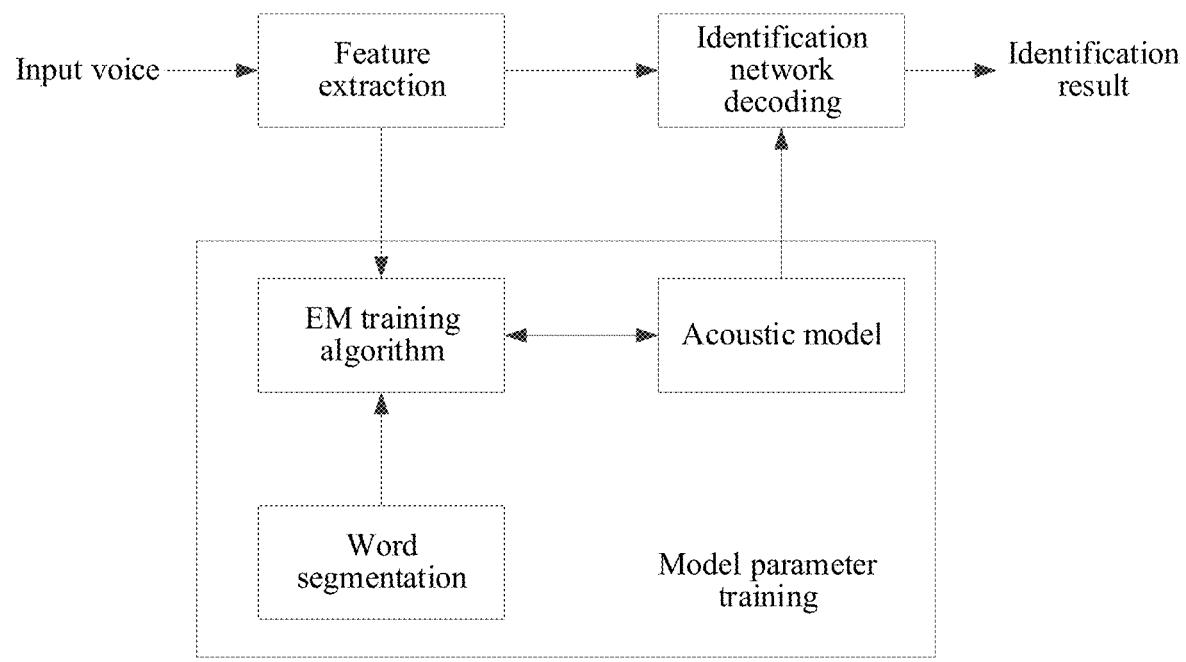
FIG. 12 is another voice interaction system according to an embodiment of this disclosure.

Alternatively, FIG. 12 is another voice interaction system according to an embodiment of this disclosure. It can be seen from FIG. 12 that feature extraction is performed on voice collected by the terminal device, and then the server preforms identification network decoding on the feature-extracted voice based on an expectation maximization (EM) training algorithm, word segmentation, and an acoustic model to obtain the identification result. It should be understood that in practical applications, other voice interaction systems may be further included, which are not limited in the embodiments of this disclosure.

For example, if a user has any question in a process of obtaining the first virtual prop, the user can inform the server of the question through voice or text, and the server may feed back a corresponding guidance process, which is not specifically limited in the embodiments of this disclosure.

Figure 13:
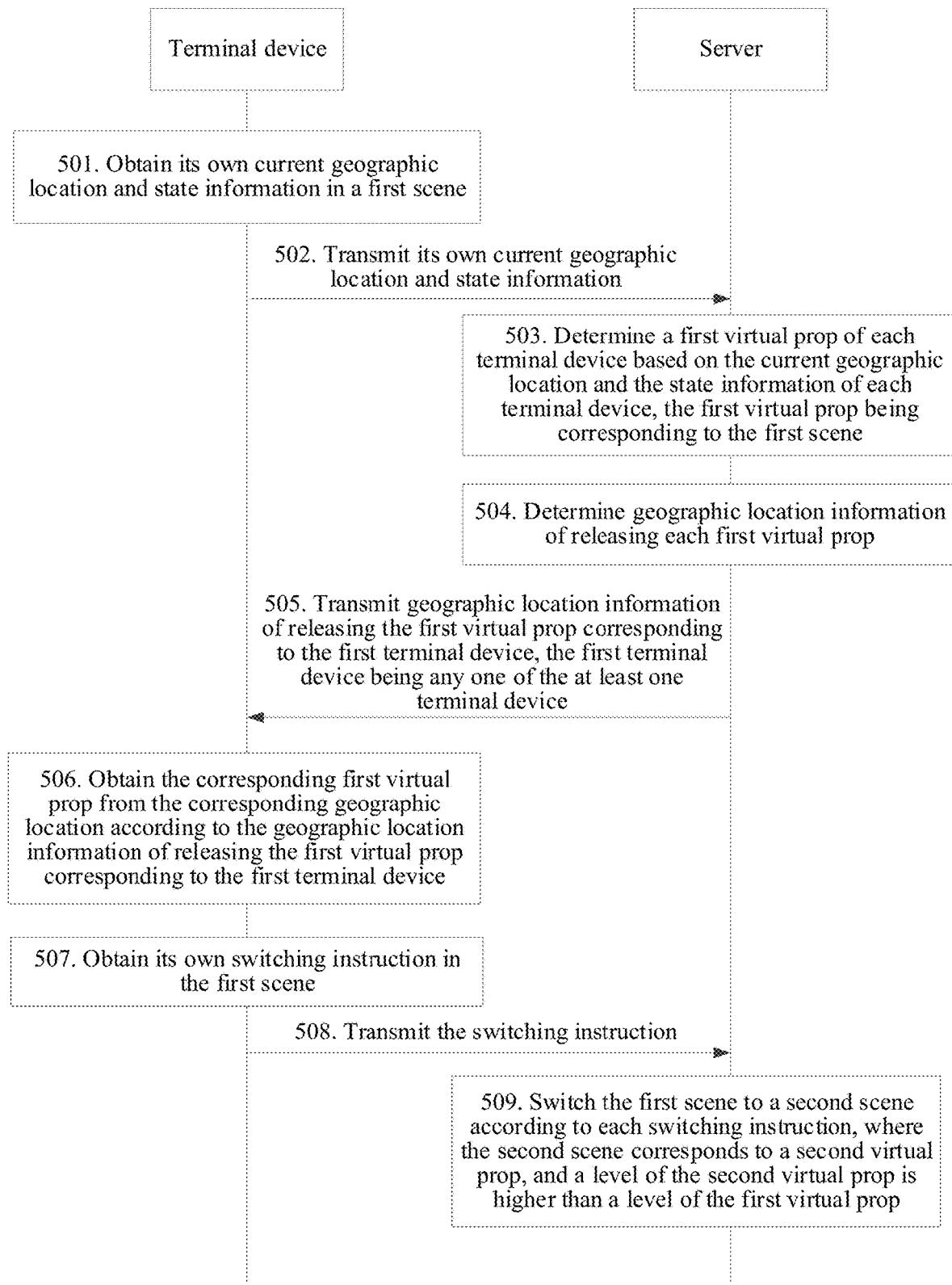
FIG. 13 is a schematic diagram of another embodiment of a virtual prop allocation method according to an embodiment of this disclosure.

To facilitate a better understanding of the solutions provided in the embodiments of this disclosure, a specific process in the embodiments is introduced below. FIG. 13 is a schematic diagram of an embodiment of a virtual prop allocation method according to the embodiments. The method includes:

At step 501, at least one terminal device obtains its own current geographic location and state information in a first scene.

At step 502, each terminal device transmits its own current geographic location and state information to a server.

At step 503, the server determines a first virtual prop of each terminal device based on the current geographic location and the state information of each terminal device, the first virtual prop being corresponding to the first scene.

At step 504, the server determines geographic location information of releasing each first virtual prop.

At step 505, the server transmits, to a first terminal device, geographic location information of releasing a first virtual prop corresponding to the first terminal device, the first terminal device being any one of the at least one terminal device.

At step 506, the first terminal device obtains the corresponding first virtual prop from the corresponding geographic location according to the geographic location information of releasing the first virtual prop corresponding to the first terminal device.

In this embodiment, steps 501 to 506 are similar to steps 201 to 206 described in FIG. 2, and details are not repeated herein.

At step 507, each terminal device obtains its own switching instruction in the first scene.

In this embodiment, after each first terminal device in at least one terminal device obtains the corresponding first virtual prop from the corresponding geographic location, it means that a user receives a corresponding reward in the current first scene. In this case, the user enters a next scene, and continues to obtain the corresponding virtual prop in the next scene. It should be understood that a switching operation can be triggered by clicking a switching button, inputting voice, etc., to obtain the corresponding switching instruction, which is not specifically limited in the embodiments of this disclosure.

At step 508, each terminal device transmits the switching instruction to the server.

In this embodiment, after obtaining the corresponding first virtual prop in the first scene, the terminal device transmits a switching instruction to the server, so that the server can switch the first scene to a second scene under the indication of the switching instruction, to further cause each terminal device to enter the second scene and continue to obtain a corresponding second virtual prop in the second scene.

At step 509, the server switches the first scene to the second scene according to each switching instruction, where the second scene corresponds to a second virtual prop, and a level of the second virtual prop is higher than a level of the first virtual prop.

Figure 14:
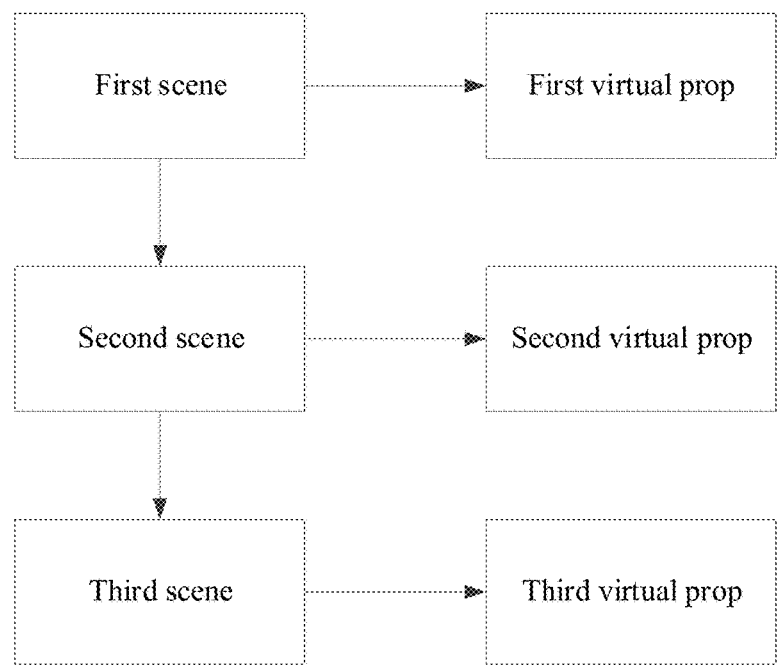
FIG. 14 is a schematic diagram of changing a scene according to an embodiment of this disclosure.

In this embodiment, because the interactive activity can include at least one scene, and each scene is equipped with a different virtual prop. FIG. 14 is a schematic diagram of changing a scene according to an embodiment of this disclosure. It can be seen from FIG. 14 that as a level of a scene increases, a level of the corresponding virtual prop also increases. For example, the first virtual prop in the first scene may be a raincoat, the second virtual prop in the second scene may be an umbrella, and a third virtual prop in a third scene may be a car, etc., which are not specifically limited in this embodiment.

Therefore, after the server switches the first scene to the second scene, each terminal device can obtain its own current geographic location and state information in the second scene and then transmit the current geographic location and the state information in the second scene to the server.

Then, the server determines the second virtual prop of each terminal device in the second scene based on the current geographic location and the state information of each terminal device. In this case, the server determines the geographic location information of releasing each second virtual prop based on a correspondence between the second virtual prop stored in the second scene and the corresponding geographic location information of releasing each second virtual prop, to transmit the geographic location information of releasing the second virtual prop corresponding to the first terminal device to the first terminal device. In this way, the first terminal device obtains the corresponding first virtual prop from the corresponding geographic location according to the geographic location information of releasing the second virtual prop corresponding to the first terminal device. For details, reference may be made to the description of steps 201 to 206 described in FIG. 2 for understanding, which are not repeated herein.

It should be understood that in different scenes, reference can be made to the above-mentioned steps 501 to 509 for understanding. Specifically, only an example in which the first scene is switched to the second scene is used for description herein. Specifically, in the embodiments of this disclosure, the first scene and the second scene are not limited.

In an embodiment of this disclosure, in combination with switching between different scenes, the whole interactive activity is more interesting and interactive.

The solutions provided in the embodiments of this disclosure are mainly described above from the perspective of methods. It may be understood that to implement the foregoing functions, corresponding hardware structures and/or software modules for performing the functions are included. A person skilled in the art should be easily aware that in combination with modules and algorithm steps of examples described in the embodiments disclosed in this disclosure, this disclosure can be implemented by hardware or a combination of hardware and computer software. Whether a function is performed by hardware or computer software driving hardware depends on particular applications and design constraints of the technical solutions. A person skilled in the art may use different methods to implement the described functions for each particular application, but it should not be considered that the implementation goes beyond the scope of this disclosure.

In an embodiment of this disclosure, apparatuses may be divided into functional modules based on the foregoing method examples. For example, the functional modules may be divided corresponding to the functions, or two or more functions may be integrated into one processing module. The integrated module is implemented in the form of hardware, or is implemented in the form of a software functional module. In an embodiment of this disclosure, the module division is an example, and is merely logical function division, and there may be other division manners during practical application.

Figure 15:
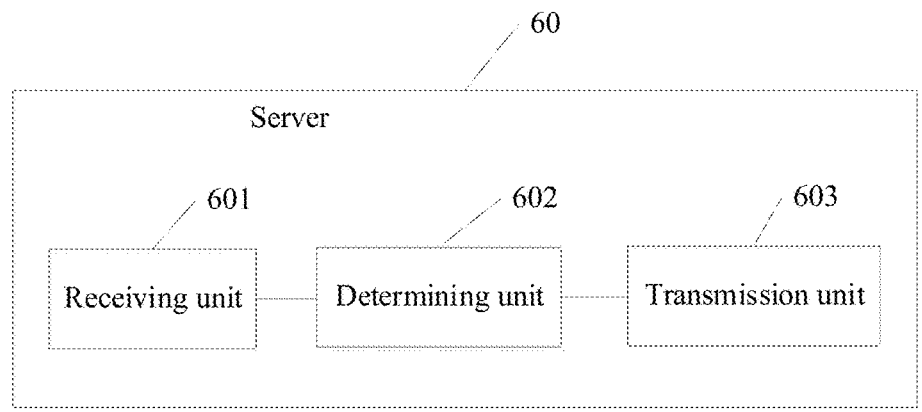
FIG. 15 is a schematic diagram of an embodiment of a server according to an embodiment of this disclosure.

A server 60 in the embodiments of this disclosure is described in detail below. FIG. 15 is a schematic diagram of an embodiment of a server 60 according to an embodiment of this disclosure. The server 60 includes a receiving unit 601, a determining unit 602, and a transmission unit 603. One or more units can be implemented by processing circuitry, software, or a combination thereof, for example.

The receiving unit 601 is configured to obtain a geographic location and state information of at least one terminal device in a first scene;

The determining unit 602 is configured to determine a first virtual prop corresponding to each terminal device based on the geographic location and the state information of each terminal device received by the receiving unit 601, the first virtual prop corresponds to the first scene.

The determining unit 602 is configured to determine geographic location information of releasing the first virtual prop.

The transmission unit 603 is configured to transmit, to a first terminal device, geographic location information of releasing a first virtual prop corresponding to the first terminal device to indicate to obtain the corresponding first virtual prop, the first terminal device is any one of the at least one terminal device.

In some examples, based on the embodiment corresponding to the foregoing FIG. 15, in another embodiment of the server 60 provided in the embodiments of this disclosure, the state information includes environment information and user characteristic information of the terminal device, the at least one terminal device includes a plurality of terminal devices, and the determining unit 602 may include a grouping module, and a determining module. One or more modules can be implemented by processing circuitry, software, or a combination thereof, for example.

The grouping module is configured to group the plurality of terminal devices based on geographic locations of the plurality of terminal devices received by the receiving unit 601 to obtain at least one terminal device group.

The determining module is configured to determine a region corresponding to the terminal device group on a map obtained by the grouping module, where the map is pre-divided into a plurality of regions with corresponding geographic location ranges.

The determining module is configured to determine an allocation weight of the corresponding terminal device according to the user characteristic information received by the receiving unit 601.

The determining module is also configured to determine the first virtual prop of the corresponding terminal device based on the environment information and the allocation weight of the terminal device in a case that there is a corresponding virtual prop in the region corresponding to the terminal device group.

In some examples, based on the embodiment of the foregoing FIG. 15, in another embodiment of the server 60 provided in the embodiments of this disclosure, the grouping module may include a determining submodule and a grouping submodule. One or more submodules of the apparatus can be implemented by processing circuitry, software, or a combination thereof, for example.

The determining submodule is configured to determine a relative location between any two terminal devices based on geographic locations of the plurality of terminal devices.

The grouping submodule is configured to group the plurality of terminal devices based on the relative location between the any two terminal devices determined by the determining submodule.

In some examples, based on the embodiment corresponding to the foregoing FIG. 15, in another embodiment of the server 60 provided in the embodiments of this disclosure, the determining submodule calculates geographic locations of the any two terminal devices through a breadth-first algorithm to obtain the relative location between the any two terminal devices.

In some examples, based on the foregoing FIG. 15 and the embodiment corresponding to FIG. 15, in another embodiment of the server 60 provided in the embodiments of this disclosure, the transmission unit 603 may include a transmission module. The transmission module can be implemented by processing circuitry, software, or a combination thereof, for example.

The transmission module, is configured to transmit a voice message or a text message to the first terminal device, where the voice message or the text message carries the geographic location information of releasing the first virtual prop corresponding to the first terminal device.

Figure 16:
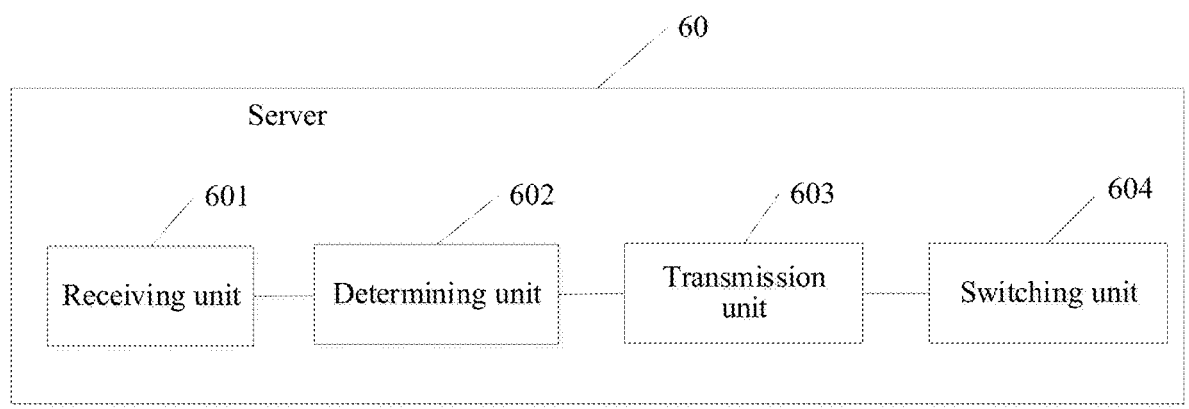
FIG. 16 is a schematic diagram of another embodiment of a server according to an embodiment of this disclosure.

In some examples, based on the foregoing FIG. 15 and the embodiment corresponding to FIG. 15, reference is made to FIG. 16, which is a schematic diagram of another embodiment of the server 60 according to an embodiment of this disclosure.

The receiving unit 601 is further configured to receive a switching instruction transmitted by the terminal device; and in some examples, the server 60 may further include a switching unit 604.

The switching unit 604 is configured to switch a first scene in which the terminal device is located to a second scene according to the switching instruction received by the receiving unit 601, where the second scene corresponds to a second virtual prop, and a level of the second virtual prop is higher than a level of the first virtual prop.

Figure 17:
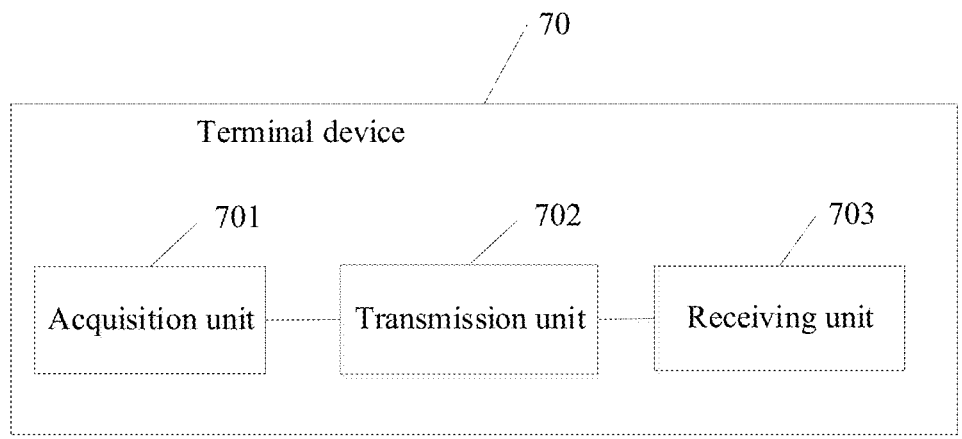
FIG. 17 is a schematic diagram of an embodiment of a terminal device according to an embodiment of this disclosure.

The server 60 in the embodiments of this disclosure is described above from the perspective of modularized functional entities. A terminal device 70 in the embodiments of this disclosure is described below from the perspective of modularization. FIG. 17 is a schematic diagram of an embodiment of a terminal device 70 according to an embodiment of this disclosure. The terminal device 70 may include an acquisition unit 701, a transmission unit 702, and a receiving unit 703. One or more units of the apparatus can be implemented by processing circuitry, software, or a combination thereof, for example.

The acquisition unit 701 is configured to obtain a geographic location and state information in a first scene.

The transmission unit 702 is configured to transmit the geographic location and the state information to a server, so that the server determines a first virtual prop corresponding to each terminal device based on the geographic location and the state information of each terminal device, the first virtual prop corresponds to the first scene.

The receiving unit 703 is configured to receive geographic location information of releasing the first virtual prop transmitted by the server.

The acquisition unit 701 is configured to obtain the first virtual prop corresponding to the terminal device from the corresponding geographic location according to the geographic location information of releasing the first virtual prop received by the receiving unit 703.

In some examples, based on the embodiment corresponding to the foregoing FIG. 17, in another embodiment of the terminal device 70 according to this embodiment of this disclosure, the terminal device 70 further includes a collection unit, and a first correction unit. One or more units of the apparatus can be implemented by processing circuitry, software, or a combination thereof, for example.

The collection unit is configured to collect first ambient environment information through a configured camera.

The first correction unit is configured to correct the geographic location based on a corresponding Internet Protocol (IP) address and the first ambient environment information.

In some examples, based on the embodiment corresponding to the foregoing FIG. 17, in another embodiment of the terminal device 70 according to this embodiment of this disclosure, the acquisition unit is further configured to obtain a plurality of pieces of historical geographic location information, and collect second ambient environment information through a configured camera; and in some examples, the terminal device 70 further includes a second correction unit. The second correction unit can be implemented by processing circuitry, software, or a combination thereof, for example.

The second correction unit is configured to correct the geographic location based on the plurality of pieces of historical geographic location information and the second ambient environment information obtained by the acquisition unit.

In some examples, based on the foregoing FIG. 17 and the embodiment corresponding to FIG. 17, in another embodiment of the terminal device 70 according to this embodiment of this disclosure, the receiving unit 703 may include a receiving module. The receiving module can be implemented by processing circuitry, software, or a combination thereof, for example.

The receiving module is configured to receive a voice message or a text message transmitted by the server, where the voice message or the text message carries the geographic location information of releasing the first virtual prop corresponding to the first terminal device.

In some examples, based on the foregoing FIG. 17 and the embodiment corresponding to FIG. 17, in another embodiment of the terminal device 70 according to this embodiment of this disclosure, the acquisition unit 701 is further configured to obtain a switching instruction in the first scene; and the transmission unit 703 is configured to transmit the switching instruction to the server, so that the server switches the first scene to a second scene, where the second scene corresponds to a second virtual prop, and a level of the second virtual prop is higher than a level of the first virtual prop.

Figure 18:
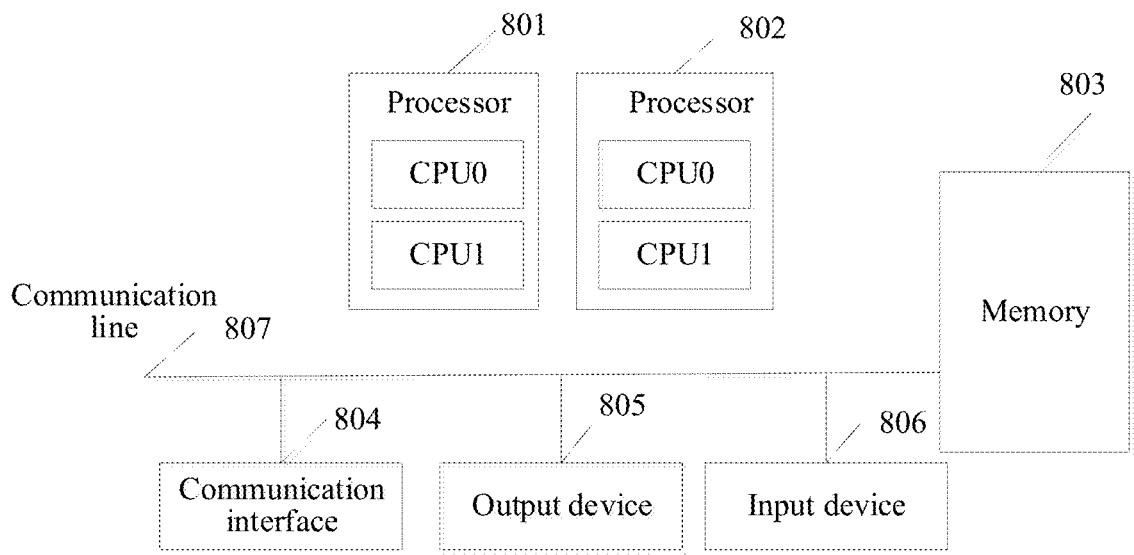
FIG. 18 is a schematic diagram of a hardware structure of a communication apparatus according to an embodiment of this disclosure.

The server 60 and the terminal device 70 in the embodiments of this disclosure are described above from the perspective of modularized functional entities. The server 60 and the terminal device 70 in the embodiments of this disclosure are described below from the perspective of hardware processing. FIG. 18 is a schematic diagram of a hardware structure of a communication apparatus according to an embodiment of this disclosure. As shown in FIG. 18, the communication apparatus includes at least one processor 801, a communication line 807, a memory 803, and at least one communication interface 804.

The processor 801 may be a general-purpose central processing unit (CPU), a microprocessor, an application-specific integrated circuit (ASIC), or one or more integrated circuits configured to control execution of a program in the solutions of this disclosure.

The communication line 807 may include a channel, to transmit information between the foregoing components.

The communication interface 804 is applicable to any transceiver-type apparatus, and is configured to communicate with another apparatus or a communication network such as Ethernet, a radio access network (RAN), or a wireless local area network (WLAN).

The memory 803 may be a read-only memory (ROM) or another type of static storage apparatus that can store static information and instructions, a random access memory (RAM), or another type of dynamic storage apparatus that can store information and instructions. The memory may exist independently and is connected to the processor through the communication line 807. Alternatively, the memory may be integrated with the processor.

The memory 803 is configured to store computer-executable instructions for executing the solutions of this disclosure, and the processor 801 controls execution. The processor 801 is configured to execute computer-executable instructions stored in the memory 803 to implement the virtual prop allocation method provided in the embodiments of this disclosure.

In some examples, the computer-executable instructions in this embodiment of this disclosure may also be referred to as application code, which are not specifically limited in the embodiments of this disclosure.

During specific implementation, in an embodiment, the communication apparatus may include processing circuitry. The processing circuitry can include a plurality of processors, such as the processor 801 and a processor 802 in FIG. 18. Each of these processors may be a single-core (single-CPU) processor, or may be a multi-core (multi-CPU) processor. The processor herein may be one or more apparatuses or circuits, and/or a processing core configured to process data (for example, a computer program instruction).

During specific implementation, in an embodiment, the communication apparatus may further include an output device 805 and an input device 806. The output device 805 communicates with the processor 801, and may display information in a plurality of manners. The input device 806 communicates with the processor 801, and may receive an input by a user in a plurality of manners. For example, the input device 806 may be a mouse, a touchscreen apparatus, a sensing apparatus, or the like.

The above-mentioned communication apparatus may be a general-purpose apparatus or a dedicated apparatus. In a specific implementation, the communication apparatus may be a desktop computer, a portable computer, a network server, a wireless terminal apparatus, an embedded apparatus, or an apparatus with a structure similar to that in FIG. 18. The embodiments of this disclosure do not limit a type of the communication apparatus.

The receiving unit 601, the acquisition unit 701, and the receiving unit 703 can all be implemented by the input device 806, the transmission unit 603 and the transmission unit 702 can both be implemented by the output device 805, and the determining unit 602 and the switching unit 604 can both be implemented by the processor 801 or the processor 802.

In addition, an embodiment of this disclosure further provides a storage medium (e.g., a non-transitory computer-readable storage medium), configured to store a computer program, the computer program being configured to perform the method according to the foregoing embodiments.

An embodiment of this disclosure further provides a computer program product including instructions, the instructions, when run on a computer, causing the computer to perform the method according to the foregoing embodiments.

In the foregoing embodiments, all or some of the procedures or functions may be implemented by using software, hardware, firmware, or any combination thereof. When software is used to implement the embodiments, the embodiments may be implemented completely or partially in a form of a computer program product.

A person skilled in the art can clearly understand that for convenience and conciseness of description, for specific working processes of the foregoing described system, apparatus, and unit, refer to the corresponding processes in the foregoing method embodiments, and details are not described herein.

In the several embodiments provided in this disclosure, the disclosed system, apparatus, and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and components displayed as units may or may not be physical units, that is, may be located in one position, or may be distributed on a plurality of network units. Some or all of the units may be selected according to actual requirements to achieve the objectives of the solutions of the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the related art, all or some of the technical solutions may be implemented in a form of a software product. The computer software product is stored in a storage medium, and includes several instructions for indicating a computer device (which may be a personal computer, a server, a network device, or the like) to perform all or some of the steps of the methods in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this disclosure, but not for limiting this disclosure. Although this disclosure is described in detail with reference to the foregoing embodiments, persons of ordinary skill in the art understand that they may still make modifications to the technical solutions described in the foregoing embodiments or make equivalent replacements to some technical features thereof, without departing from the spirit and scope of the technical solutions of the embodiments of this disclosure.

What is claimed is:

1. A method of virtual prop allocation, comprising:
    obtaining a geographic location and environment information of a first terminal device participating in a first scene, wherein the environment information includes a current weather condition of a geographical area of the first terminal;
    assigning an allocation weight to the first terminal device according to user age associated with the first terminal device, the allocation weight indicating a probability that the first terminal device will obtain a virtual prop;
    determining a terminal device group associated with a region on a map, the terminal device group including the first terminal device;
    selecting, for the first terminal device, a first virtual prop from a prop pool of candidate virtual props associated with the region of the terminal device group based on (i) the geographic location and the environment information of the first terminal device participating in the first scene and based on (ii) the allocation weight of the first terminal device such that a type of the first virtual prop selected from the prop pool corresponding to the current weather condition of the geographical area of the first terminal device and different types of virtual props correspond to different weather conditions;
    determining geographic location information for releasing the first virtual prop; and
    transmitting, to the first terminal device, the geographic location information for releasing the first virtual prop, wherein
    the current weather condition is rain,
    the first virtual prop selected is one of an umbrella type, and
    the umbrella type is selected from a group including a small umbrella and a large umbrella depending on the allocation weight, wherein a higher allocation weight corresponds to selection of the large umbrella over the small umbrella.

2. The method according to claim 1, wherein the determining the terminal device group comprises:
    determining the terminal device group based on geographic locations of a plurality of terminal devices.

3. The method according to claim 1, wherein the determining the terminal device group comprises:
    determining a relative location of a pair of terminal devices in a plurality of terminal devices; and
    determining the terminal device group based on the relative location of the pair of terminal devices in the plurality of terminal devices.

4. The method according to claim 3, wherein the determining the relative location of the pair of terminal devices comprises:
    calculating the relative location of the pair of terminal devices by applying a breadth-first algorithm on geographic locations of the plurality of terminal devices.

5. The method according to claim 1, wherein the transmitting the geographic location information for releasing the first virtual prop comprises:
    transmitting at least one of a voice message or a text message to the first terminal device, wherein the voice message or the text message includes the geographic location information for releasing the first virtual prop.

6. The method according to claim 1, wherein after the transmitting the geographic location information for releasing the first virtual prop, the method further comprises:
    receiving a switching instruction transmitted by the first terminal device; and
    switching from the first scene to a second scene for the first terminal device to participate in according to the switching instruction, wherein the second scene has a second virtual prop associated with the second scene.

7. A server device, comprising:
    processing circuitry configured to:
        obtain a geographic location and environment information of a first terminal device participating in a first scene, wherein the environment information includes a current weather condition of a geographical area of the first terminal;
        assign an allocation weight to the first terminal device according to user age associated with the first terminal device, the allocation weight indicating a probability that the first terminal device will obtain a virtual prop;
        determine a terminal device group associated with a region on a map, the terminal device group including the first terminal device;
        select, for the first terminal device, a first virtual prop from a prop pool of candidate virtual props associated with the region of the terminal device group based on (i) the geographic location and the environment information of the first terminal device participating in the first scene and based on (ii) the allocation weight of the first terminal device such that a type of the first virtual prop selected from the prop pool corresponds to the current weather condition of the geographical area of the first terminal device and different types of virtual props correspond to different weather conditions;
        determine geographic location information for releasing the first virtual prop associated with the first scene; and
        transmit to the first terminal device, the geographic location information for releasing the first virtual prop, wherein
    the current weather condition is rain,
    the first virtual prop selected is one of an umbrella type, and
    the umbrella type is selected from a group including a small umbrella and a large umbrella depending on the allocation weight, wherein a higher allocation weight corresponds to selection of the large umbrella over the small umbrella.

8. The server device according to claim 7, wherein the processing circuitry is configured to:
    determine the terminal device group based on geographic locations of a plurality of terminal devices.

9. The server device according to claim 7, wherein the processing circuitry is configured to:
    determine a relative location of a pair of terminal devices in a plurality of terminal devices; and
    determine the terminal device group based on the relative location of the pair of terminal devices in the plurality of terminal devices.

10. The server device according to claim 9, wherein the processing circuitry is configured to:
    calculate the relative location of the pair of terminal devices by applying a breadth-first algorithm on geographic locations of the plurality of terminal devices.

\* \* \* \* \*